United States Patent [19]
Jameson

[11] Patent Number: 4,740,378
[45] Date of Patent: Apr. 26, 1988

[54] CONTROL OF ATMOSPHERE IN FOR EXAMPLE FRUIT STORES

[75] Inventor: John Jameson, Maidstone, England

[73] Assignee: National Research Development Corporation, London, England

[21] Appl. No.: 915,030

[22] Filed: Oct. 3, 1986

[30] Foreign Application Priority Data

Oct. 8, 1985 [GB] United Kingdom ............... 8524740

[51] Int. Cl.⁴ .............................................. A23K 3/02
[52] U.S. Cl. ...................................... 426/419; 62/78; 62/100; 99/472; 99/474; 426/316
[58] Field of Search ....................... 62/78, 93, 94, 100; 426/418, 419, 312, 314, 316, 270; 99/467, 468, 472, 473, 474

[56] References Cited

U.S. PATENT DOCUMENTS

| | | | |
|---|---|---|---|
| 3,102,777 | 9/1963 | Bedrosian et al. | 426/419 X |
| 3,313,631 | 4/1967 | Jensen | 426/419 X |
| 3,368,873 | 2/1968 | Fuller et al. | 426/419 X |
| 3,415,310 | 12/1968 | Kuhlmann | 62/78 |
| 4,055,931 | 11/1977 | Myers | 426/419 X |
| 4,228,197 | 10/1980 | Means | 426/419 |
| 4,537,043 | 8/1985 | Volker et al. | 62/78 X |

FOREIGN PATENT DOCUMENTS 1251719 10/1971 United Kingdom .
1314101 4/1973 United Kingdom .

*Primary Examiner*—Steven E. Warner
*Attorney, Agent, or Firm*—Cushman, Darby & Cushman

[57] ABSTRACT

In a refrigerated fruit store 1, the atmosphere is controlled to low levels of oxygen and carbon dioxide using an activated carbon bed 2, by continuously repeating the following cycle of operations:

(1) expose the carbon in the bed 2 to the atmosphere in the fruit store 1, until saturated with $CO_2$ (12 minutes);
(2) evacuate the bed 2, down to 7 kPa, to the gas reservoir 5, whereby the $O_2$ and $N_2$ (but not $CO_2$) are released in "fruit store" proportions into the reservoir (2 minutes);
(3) expose the bed 2 to air to purge it of the $CO_2$ (18 minutes);
(4) evacuate the bed 2 to waste (7 kPa is adequate) to remove $O_2$ and $N_2$, which would otherwise remain in the bed in substantially "air" proportions (i.e. excessive oxygen) (2 minutes);
(5) expose the bed 2 to the gas put in the reservoir 5 at operation (2) above, so that the bed 2 now contains $O_2$ and $N_2$ in "fruit store" proportions (2 minutes);
(1) expose the adsorptive medium to chamber atmosphere; and so forth indefinitely.

2 Claims, 1 Drawing Sheet

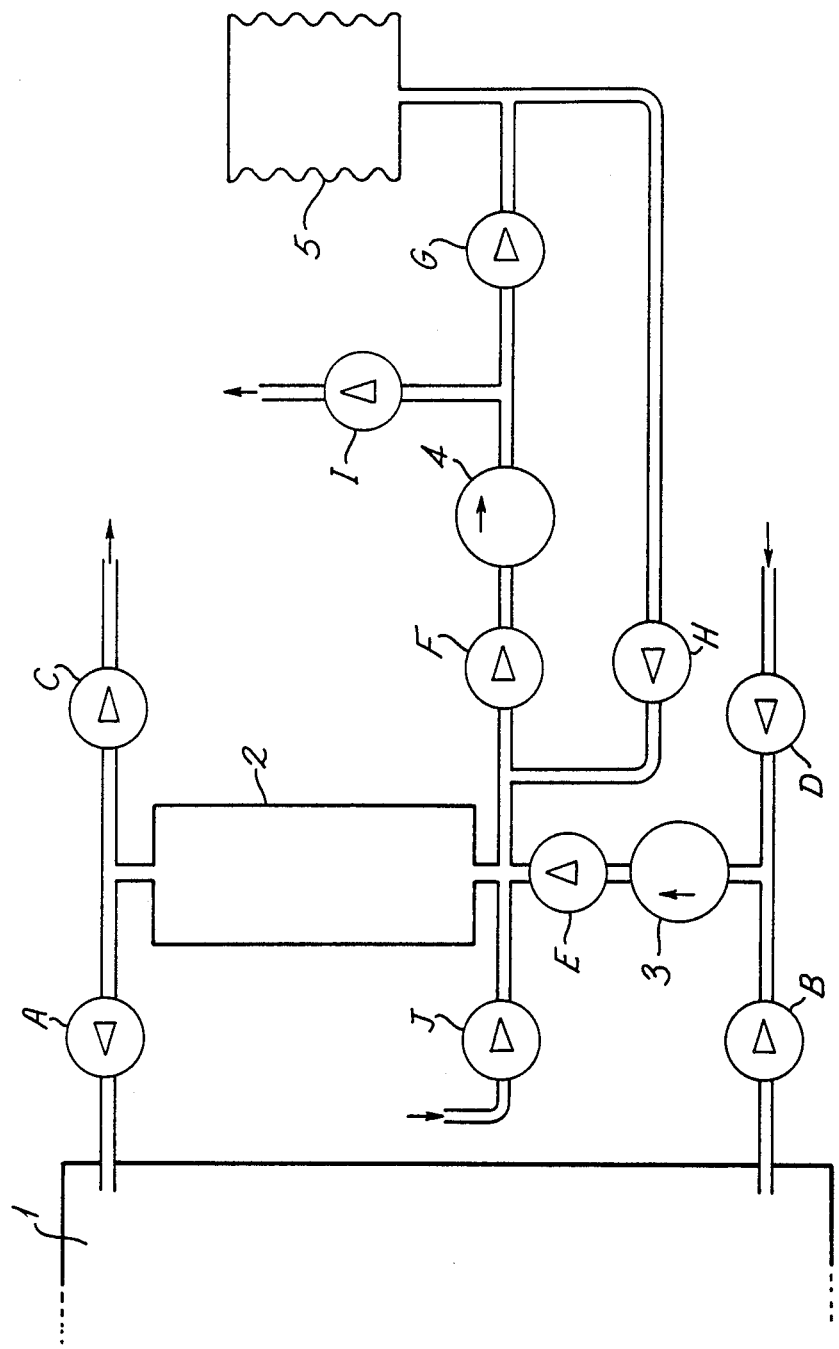

CONTROL OF ATMOSPHERE IN FOR EXAMPLE FRUIT STORES

BACKGROUND OF THE INVENTION

This invention relates to a method and apparatus for controlling an atmosphere, such as the atmosphere in a fruit store.

Considering apples as an example, apples are harvested over only a few weeks in the year but must be available to the retail market all year round. Apples may be satisfactorily stored at low temperature in a modified atmosphere. Typically, UK grown Cox's Orange Pippin is stored for 7-8 months at 3.5°-4.0° C., in a nitrogen atmosphere containing 1 to 1¼% $O_2$ and containing under 1% $CO_2$. Apples respire even after they are picked, consuming $O_2$ and producing $CO_2$. Hence, in a sealed store, this $O_2$ concentration is reached by itself (after about 8 days) and is maintained simply by the controlled admission of air (21% $O_2$); the problem is to remove excess $CO_2$.

For removing $CO_2$, the most commonly used scrubbing technique (in the UK) is the addition to the store of dry, bagged, hydrated lime ($Ca(OH)_2$) which absorbs $CO_2$ by chemical reaction. This is simple, reliable, and requires no capital outlay. However, the running costs are high, about £ 300 per year for a 100 tonne fruit store. Additionally, the labour costs are high, the lime being messy and awkward to handle. Furthermore, the entire annual demand for lime for this purpose arises over a few weeks, which makes it unattractive for manufacturers to cater specially for this demand.

A common, more convenient, alternative to the use of lime is a mechanical activated carbon adsorber. This works by passing store atmosphere through a bed containing activated carbon so that $CO_2$ is adsorbed and the remaining gas returned to the store. Typically after 5-10 minutes, the activated carbon becomes saturated with $CO_2$. It is then regenerated by passing fresh air through the bed, whereupon $CO_2$ is desorbed into the air stream. Once the bed is free of $CO_2$ it is ready for a further adsorption phase.

This simple adsorber suffers the important shortcoming that, following regeneration, the bed is left full of air, which in the ensuing adsorption phase is discharged into the store. In this way, oxygen is repeatedly discharged into the store, often at a faster rate than the fruit consumes it, so that the optimum oxygen concentration becomes exceeded.

To reduce this shortcoming, most scrubber manufacturers adopt a valve control sequence whereby, between regenerating the bed and the next adsorption phase, the bed is briefly purged with store atmosphere (which is then vented to exhaust) to remove excess oxygen from the bed. An inverse sequence is organised between adsorption and regeneration so that store atmosphere remaining in the bed (with its valuable low oxygen concentration) is not expelled to waste.

These sequences do indeed decrease the mass of oxygen added to the store via the scrubber, but at the cost of subjecting the store to a slight cyclic vacuum and overpressure. Hence if the store is not absolutely gas-tight, air gain or store-atmosphere loss will occur through leaks in the structure of the store and around doors and hatches.

Scrubbers operating in this way are satisfactory for use at 1% $CO_2$+1¼% $O_2$, only if they are well maintained. In one trial, such a scrubber, operated with great care, did keep the $CO_2$ down to 0.8%. In practice, however, the performance of many commercial scrubbers is such that higher $CO_2$ concentrations have to be accepted in order to maintain low oxygen concentrations.

SUMMARY OF THE INVENTION

According to the present invention, a method of controlling an atmosphere in a chamber comprises indefinitely repeating the following sequence of operations (1) to (5):

(1) expose an adsorptive medium to the chamber atmosphere;
(2) evacuate the adsorptive medium to a gas reservoir;
(3) expose the adsorptive medium to air;
(4) evacuate the adsorptive medium to waste;
(5) expose the adsorptive medium to the gas reservoir.

This method may find application where the chamber atmosphere contains components X, Y and Z, of which X and Y are present in air but in the wrong proportions and of which Z has to be kept below a maximum level (which is however higher than in air); in such a case, the adsorptive medium may be chosen to adsorb Z preferentially. Operation (3) will rid the adsorptive medium of Z. The gas reservoir will in time contain X and Y in the correct proportions, with which it replenishes the adsorptive medium during operation (5).

The evacuation in operations (2) and/or (4) is preferably to a pressure of under 50 kPa (½ atmosphere), more preferably under 20 kPa, most preferably under 10 kPa. Pressures under about 5 kPa, though they will work, are expensive and unnecessary, and preclude water-sealed pumps, which are advantageous over high-vacuum oil-sealed pumps in the context of food-related processes because accidental contamination of the atmosphere by water is immaterial but contamination by oil may be harmful.

The gas reservoir may be a flexible bag, thus under atmospheric pressure at all times regardless of the mass of gas in it. This avoids the disadvantageous cyclic vacuum and overpressure referred to above.

Where the chamber atmosphere is to be controlled to maintain carbon dioxide below a certain concentration, the adsorptive medium is preferably activated carbon. Carbon, unlike adsorptive media such as alumina, can cope with the high (90%) relative humidity expected when the chamber is a fruit store.

The invention extends to apparatus for controlling an atmosphere arranged to operate as set forth above.

BRIEF DESCRIPTION OF THE DRAWING

The invention will now be described by way of example with reference to the accompanying drawing, in which the sole FIGURE shows schematically a fruit store with apparatus for controlling its atmosphere.

DETAILED DESCRIPTION

A fruit store 1, with a capacity of 100 tonne apples (a common size in Britain), is held at 3.5° C. by conventional refrigeration equipment (not shown). The best temperature will depend on apple variety, time of harvesting, growing conditions that year, and so on, as is well known.

A container containing a bed 2 of activated carbon, as an adsorptive medium, is connected to the fruit store 1 through one-way controllable valves B, E and A and a fan 3. (All components designated by letters are on/off valves, passing gas in only the direction shown). Air can be admitted to the upstream end of the bed 2 through J, and to the upstream side of the fan 3 through D. The fan 3 can pass 210 m³ air per hour against an overpressure of 1.9 kPa. The bed 2 is in a rigid tube of 600 mm diameter and 1340 mm length (approximately 380 liters), and the carbon is steam-activated extruded carbon as used in some conventional scrubbers, type Norit R2030.

The bed 2 can be vented to exhaust through its downstream end through C. The bed 2 can be evacuated through its upstream end via F and a water-sealed vacuum pump 4 capable of evacuating to 7 kPa. The evacuation can be directed either to exhaust via I or to a gas reservoir 5 via G. The gas reservoir may be emptied through H to the upstream end of the bed 2. The gas reservoir 5 is a flexible collapsible bag of impervious material of capacity 2 m³, subject externally to ordinary atmospheric pressure. The impervious material of the bag is a nylon-reinforced PVC sheeting, such as is sometimes used as campers' groundsheet.

Other valves (not shown) may be provided if desired at appropriate locations, for start-up or purging or exceptional purposes, but the apparatus as shown will perform the essential steps of the method satisfactorily.

In operation, the fruit store 1 is loaded with 100 tonne freshly picked Cox's Orange Pippin and cooled to 3.5° C. The atmosphere in the fruit store is, of course, air at this stage, i.e. containing 21% $O_2$. Fruit respiration consumes the oxygen naturally, to an equilibrium level of 1.25% $O_2$ in about eight days with this variety of apples. Trials have shown little commercial advantage in artificially faster oxygen removal.

The apparatus continuously repeats the following cycle of operations, the indicated durations of each operation being improvable in any specific installation by trial and error:

(1) expose the carbon in the bed 2 to the atmosphere in the fruit store 1, until saturated with $CO_2$ (12 minutes);
(2) evacuate the bed 2, down to 7 kPa, to the gas reservoir 5, whereby the $O_2$ and $N_2$ (but not $CO_2$) are released in "fruit store" proportions into the reservoir (2 minutes);
(3) expose the bed 2 to air to purge it of the $CO_2$ (18 minutes);
(4) evacuate the bed 2 to waste (7 kPa is adequate) to remove $O_2$ and $N_2$, which would otherwise remain in the bed in substantially "air" proportions (i.e. excessive oxygen) (2 minutes);
(5) expose the bed 2 to the gas put in the reservoir 5 at operation (2) above, so that the bed 2 now contains $O_2$ and $N_2$ in "fruit store" proportions (2 minutes);
(1) expose the adsorptive medium to chamber atmosphere; and so forth indefinitely.

At the start of operation (3), the bed 2 is refilled with air slowly, to avoid stirring it up, using the air admission valve J, taking ½-1 minute.

Note that the bed, being at atmospheric pressure after operation (5), imposes no pressure variation in operation (1) on the store, and that, due to operation (5), the bed does not contain excessive oxygen which would otherwise exude undesirably into the fruit store. It is a property of the carbon in the bed that $CO_2$ is more strongly retained than $O_2$ or $N_2$, which are themselves about equally strongly retained. Thus, under the conditions of operation (2), the $CO_2$ remains safely in the bed, while in operations (5) and (1) the desirable "fruit store" proportions of $O_2$ and $N_2$ are maintained.

As used in this specification, "labour" is the British spelling of "labor"; "organised" is the British spelling of "organized"; "tonne" is a metric measure of mass; and "store" is a British term for designating a storage warehouse.

To achieve this cycle of operations, the components are switched as follows:

| Component | A | B | C | D | E | F | G | H | I | J | Fan 3 | Pump 4 |
|---|---|---|---|---|---|---|---|---|---|---|---|---|
| Operation (1) | X | X | | X | | | | | | | X | |
| Operation (2) | | | | | | X | X | | | | | X |
| Operation (3) first: | | | | | | | | | X | | | |
| then: | | | X | X | X | | | | | | X | |
| Operation (4) | | | | | | X | | X | | | | X |
| Operation (5) | | | | | | | | X | | | | |

X = on or open
Blank = off or closed

I claim:
1. A method for controlling $CO_2$ build-up in an atmosphere in a closed cold storage warehouse for fresh fruit which, by respiring, is taking-up oxygen from the warehouse atmosphere and releasing $CO_2$ to the warehouse atmosphere, comprising:
   providing a container of adsorptive medium which more strongly adsorbs $CO_2$ than it does $O_2$ and $N_2$, an expansible/collapsible gas reservoir at atmospheric pressure, and valved gas passages:
   (i) between said warehouse and said container of adsorptive medium,
   (ii) between said container of adsorptive medium and said gas reservoir, and
   (iii) between said gas reservoir and external atmosphere relative to said warehouse; and
   repeatedly conducting the following sequence of steps while refrigerating said atmosphere of said warehouse down to about 3.5° C. and about 90 percent relative humidity:
   (a) opening gas passage (i) while gas passages (ii) and (iii) remain closed, at a time when said atmosphere of said warehouse contains an excess of $CO_2$ and a deficit of $O_2$ in relation to external atmospheric air, until said adsorptive medium is substantially saturated with $CO_2$;
   (b) closing gas passage (i) and opening gas passage (ii) while gas passage (iii) remains closed, and evacuating the atmosphere in said container into said gas reservoir, by vacuum pumping through gas passage (ii), until the pressure in said container is about 7 kPa but the pressure in said gas reservoir remains at about 1 atmosphere, so that said gas reservoir expands and becomes filled with $O_2$ and $N_2$ substantially in the same proportions in which those gases then exist in said atmosphere of said warehouse, but $CO_2$ in a lower proportion than that in which $CO_2$ then exists in said atmosphere of said warehouse;

(c) closing gas passage (ii) and opening gas passage (iii) while gas passage (i) remains closed and permitting $CO_2$ which has become adsorbed in said adsorptive medium to purge therefrom to atmosphere externally of said warehouse atmosphere until the amount of $CO_2$ present in said container at the beginning of this step has substantially diminished;

(d) while gas passages (i) and (ii) remain closed, evacuating the atmosphere of said container, to waste, by vacuum pumping through gas passage (iii), until the pressure in said container is about 7 kPa, thereby removing $O_2$ and $N_2$ from said container in external atmosphere proportions; and (e) closing gas passage (iii) and opening gas passage (ii) while gas passage (i) remains closed, and thereby permitting said container to become refilled from said gas reservoir as said gas reservoir collapses, with an atmosphere which contains $O_2$ and $N_2$ in proportions approximating those then present in said warehouse atmosphere, but $CO_2$ in a lower proportion than that in which $CO_2$ then exists in said warehouse atmosphere.

2. A method for controlling $CO_2$ build-up in an atmosphere in a closed cold storage warehouse for fresh fruit which, by respiring, is taking-up oxygen from the warehouse atmosphere and releasing $CO_2$ to the warehouse atmosphere, comprising:

providing a container of adsorptive medium which more strongly adsorbs $CO_2$ than it does $O_2$ and $N_2$, an expansible/collapsible gas reservoir at atmospheric pressure, and valved gas passages:
(i) between said warehouse and said container of adsorptive medium,
(ii) between said container of adsorptive medium and said gas reservoir, and
(iii) between said gas reservoir and external atmosphere relative to said warehouse; and repeatedly conducting the following sequence of steps while refrigerating said atmosphere of said warehouse:

(a) opening gas passage (i) while gas passages (ii) and (iii) remain closed, at a time when said atmosphere of said warehouse contains an excess of $CO_2$ and a deficit of $O_2$ in relation to external atmospheric air, until said absorptive medium is substantially saturated with $CO_2$;

(b) closing gas passage (i) and opening gas passage (ii) while gas passage (iii) remains closed, and evacuating the atmosphere in said container into said gas reservoir, by vacuum pumping through gas passage (ii), until the pressure in said container is from 5 kPa to 10 kPa but the pressure in said gas reservoir remains at about 1 atmosphere, so that said gas reservoir expands and becomes filled with $O_2$ and $N_2$ substantially in the same proportions in which those gases then exist in said atmosphere of said warehouse, but $CO_2$ in a lower proportion than that in which $CO_2$ then exists in said atmosphere of said warehouse;

(c) closing gas passage (ii) and opening gas passage (iii) while gas passage (i) remains closed and permitting $CO_2$ which has become absorbed in said absorptive medium to purge therefrom to atmosphere externally of said warehouse atmosphere until the amount of $CO_2$ present in said container at the beginning of this step has substantially diminished;

(d) while gas passages (i) and (ii) remain closed, evacuating the atmosphere of said container, to waste, by vacuum pumping through gas passage (iii), until the pressure in said container is from 5 kPa to 10 kPa thereby removing $O_2$ and $N_2$ from said container in external atmosphere proportions; and (e) closing gas passage (iii) and opening gas passage (ii) while gas passage (i) remains closed, and thereby permitting said container to become refilled from said gas reservoir as said gas reservoir collapses, with an atmosphere which contains $O_2$ and $N_2$ in proportions approximating those then present in said warehouse atmosphere, but $CO_2$ in a lower proportion than that in which $CO_2$ then exists in said warehouse atmosphere.

* * * * *